(12) United States Patent
Hilder (10) Patent No.: US 6,588,925 B1
(45) Date of Patent: Jul. 8, 2003

(54) ROTOR-STATOR MIXING APPARATUS ESPECIALLY FOR SINGLE SCREW EXTRUDER

(75) Inventor: Robin Hilder, Sheffield (GB)

(73) Assignee: Kaltor Limited, Sheffield (GB)

( * ) Notice: Subject to any disclaimer, the term of this patent is extended or adjusted under 35 U.S.C. 154(b) by 0 days.

(21) Appl. No.: 09/830,138

(22) PCT Filed: Oct. 19, 1999

(86) PCT No.: PCT/GB99/03349
§ 371 (c)(1),
(2), (4) Date: Apr. 19, 2001

(87) PCT Pub. No.: WO00/23179
PCT Pub. Date: Apr. 27, 2000

(30) Foreign Application Priority Data

Oct. 20, 1998 (GB) ............................................... 9822750

(51) Int. Cl.[7] .............................. B29B 7/42; B29B 7/58
(52) U.S. Cl. .......................................... 366/82; 366/304
(58) Field of Search ............................ 366/79, 81, 82, 366/89, 91, 303, 304, 315–317

(56) References Cited

U.S. PATENT DOCUMENTS

| | | | | |
|---|---|---|---|---|
| 1,676,663 A | | 7/1928 | Nicholls | |
| 2,321,599 A | * | 6/1943 | Hofmann | |
| 2,627,394 A | * | 2/1953 | Spencer | |
| 2,645,464 A | * | 7/1953 | Forbes | |
| 2,731,253 A | * | 1/1956 | Spencer | |
| 3,000,618 A | | 9/1961 | Oakes | |
| 3,081,069 A | * | 3/1963 | Oakes | |
| 3,231,242 A | | 1/1966 | Schrier | |
| 3,251,577 A | * | 5/1966 | Bolanowski | |
| 3,253,300 A | * | 5/1966 | Gove et al. | |
| 4,092,738 A | | 5/1978 | Doom | |
| 4,231,666 A | * | 11/1980 | Baron | |
| 4,408,887 A | * | 10/1983 | Yamaoka | |
| 4,416,548 A | * | 11/1983 | Carre et al. | |
| 5,320,796 A | * | 6/1994 | Harashima et al. | |
| 5,348,388 A | | 9/1994 | Geyer | |
| 5,370,456 A | * | 12/1994 | Yamaoka | |
| 5,630,909 A | * | 5/1997 | LaRiviere | |
| 6,017,996 A | * | 1/2000 | Hamada et al. | |

FOREIGN PATENT DOCUMENTS

| | | |
|---|---|---|
| BE | 447 901 A | 12/1942 |
| DE | 297 09 060 U | 7/1997 |
| EP | 0 253 139 A | 1/1988 |

* cited by examiner

Primary Examiner—Charles E. Cooley
(74) Attorney, Agent, or Firm—King & Schickli, PLLC (57) ABSTRACT

A single screw extruder comprises a mixer associated with the screw, and comprising a rotor driven by the screw and a stator, the rotor and the stator each carrying mutually facing interengaging rings of teeth whereby the material is urged outwardly from the screw along a first tortuous mixing path, and then returned inwardly to the screw along a second tortuous mixing path, with the teeth extending axially, or generally so, with respect to the longitudinal axis of the screw. The invention also includes a mixer comprising a cylindrical stator chamber having opposed, radially extending faces provided with axially projecting, radially spaced-apart rings made up of alternating teeth and ridges, a rotor rotatably fitted within the stator and provided on its opposite side faces with axially projecting, radially spaced-apart rings of alternating teeth and ridges with the rotor and stator rings interengaging with both radial and axial clearance so as to define a tortuous material flow path.

8 Claims, 13 Drawing Sheets

ROTOR-STATOR MIXING APPARATUS ESPECIALLY FOR SINGLE SCREW EXTRUDER

FIELD OF THE INVENTION

The present invention relates in one aspect to a single screw extruder for extruding combinations of materials such as thermoplastics polymers, rubbers, waxes and solid additives, and in another aspect to a mixer for such materials. The mixer could however be employed in the manufacture of inks, paints and other materials where one or more of the components is liquid at the room temperature.

BACKGROUND OF THE INVENTION

Single screw extruders are very widely used in the plastic industry for producing compounds of rubber and thermoplastic polymers with solid additives. They are simple to construct and therefore relatively inexpensive; however that they have limited distributive and dispersive mixing capacity has been long recognised and is well documented (cf "Single Screw Mixing: Problems and Solutions" Martin Gale, a paper presented at a RAPRA Technology Ltd. seminar Aug. 6, 1995).

Further background as to the mixing limitations of single screw extruders is given in an article in Plastics Additives and Compounding August/September 1995 pages 21–23 entitled "New dispersive mixers based on elongational flow" and the associated patent, U.S. Pat. No. 5,932,159, published Aug. 3, 1999. This stresses the need for a variety of dispersive forces including elongation flow and multiple passes through regions of high stress, conditions which are normally difficult to generate within a single screw machine.

There are many devices that can be used to improve the distributive mixing capacity of single screw extruders; however these devices offer only marginal improvements in dispersive mixing. A good example of this is the cavity transfer mixer (U.S. Pat. No. 4,419,014) where the process melt is transferred repeatedly between cavities in a rotor and opposed cavities in the barrel wall. The rotary motion of the rotor means that the material is constantly subdivided and re-orientated. However this does not generate a high shear rate since the walls of opposing cavities are quite widely separated. In practical devices this low shear rate also limits the maximum cavity size since there is a tendency for the melt to stagnate.

Pins can also be used to improve mixing either protruding radially from the barrel or from the surface of a rotor or the screw itself. Whilst pins do generate chaotic flow, improving distributive mixing, they do little in the way of dispersive mixing since the pins do not move relative to a complementary shear surface. In the case of pinned barrels, gaps in the helical flight sweep over the pins generate high sheer events and also allow significant re-circulation of the polymer melt improving distributive mixing. However the proportion of material subjected to high shear is quite small.

OBJECT OF INVENTION

A basic object of the invention is the provision of an improved single screw extruder, and to a mixer for use with such extruder.

Summary of a First Aspect of the Invention

According to a first aspect of the invention there is provided a single screw extruder comprising a drivable screw, with at least one flight, located within a static barrel so as to define an annular, material flow gap between the exterior of the screw and the interior of the barrel, a mixer associated with the screw, whereby material passes from an upstream portion of the flow gap, into the mixer and is then either returned to a downstream portion of the flow gap or is discharged, with the mixer comprising a rotor driven by the screw and a stator, the rotor and the stator each carrying mutually facing interengaging rings of teeth whereby the material is urged outwardly from the annular gap along a first tortuous mixing path, and then returned inwardly along a second tortuous mixing path, the teeth extending axially, or generally so, with respect to the longitudinal axis of the screw.

SUMMARY OF A SECOND ASPECT OF THE INVENTION

According to a second aspect of the invention there is provided a mixer for mixing solids with liquids, liquids and liquids e.g. polymer alloys, for use with other devices or combinations of devices capable of driving the rotor and introducing material in a fluid state into the mixer under sufficient pressure to cause the material to be mixed to flow through the mixer, the mixer comprising:

(i) a cylindrical stator chamber having opposed, radially extending faces provided with axially projecting, radially spaced-apart rings made up of alternating teeth and ridges, (ii) a rotor rotatably fitted within the stator and provided on its opposite side faces with axially projecting, radially spaced-apart rings of alternating teeth and ridges, and (iii) the rotor and stator rings interengaging with both radial and axial clearance so as to define a tortuous material flow path.

ADVANTAGES OF THE INVENTION

The extruder in accordance with the first aspect has been found to provide significant improvement in the extruder performance and the quality of extruded product compared with prior art single screw extruders, whilst the mixer in accordance with the second aspect has been found to be particularly advantageous and to provide a fundamental improvement in the mixing of solids and liquids—such as a liquid thermoplastics material and solid additive and improve the manufacture of polymer alloys. The rings on the stator may be as thin as possible whilst maintaining mechanical integrity since their only functions are to provide a barrier to melt flow and complementary shear surfaces to the rotor. This arrangement limits possible melt stagnation in the gaps between stator teeth. In addition, the screw may serve as a main bearing for the mixer, whilst because the teeth are concentric around the barrel, there is no constraint on the length of the teeth that may be provided.

PREFERRED, OR OPTIONAL, FEATURES OF THE EXTRUDER

The mixer is located intermediate the ends of the screw.

The mixer is located at the discharge end of the screw/extruder.

As the extruder will be used for extruding a range of materials, it is clear that a suite of mixers exhibiting differing geometrical properties to provide different mixing capabilities, is desirable for optimum mixing. Thus, to permit reasonably expedient changing of a mixer, the extruder is provided with readily releasable means eg a pair of releasable flanges, within which the mixer is housed.

The internal diameter of stator chamber is larger than the internal diameter of the extruder to which it is attached and the rotor is relatively short.

PREFERRED, OR OPTIONAL, FEATURES OF THE MIXER

Clearly, the mixer can be used in combination with any apparatus capable of introducing the materials to be mixed under sufficient pressure to cause these materials to flow through the mixer. One such apparatus is a single screw extruder. Thus it is necessary to provide the mixer with an entry aperture and an exit aperture for material feed under pressure into, through, and out of, the exit aperture of the mixer. In the mixer the materials undergo four actions namely (i) a radial movement under pressure suitably from a central feed port to an outlet port, (ii) an orbital movement involving division of the radially moving material into portions some of which go one way while vicinal portions go the opposite way and (iii) a shearing action (iv) an elongational deformation.

This mixer differs from that of a conventional extruder configuration—with a long thin screw and any ancillary mixers are contained in a narrow cylinder, i.e. the primary internal barrel diameter—since the mixer has, in it is preferred configurations, a short broad rotor within a chamber with an internal diameter greater than that of the barrel to which it is attached. Looking at this basic geometry two significant advantages become clear. Firstly the shortest path length through the mixer increases only linearly with rotor radius whilst the volume available for mixing increases with the square of that radius. Secondly angular velocity rises linearly with the rotor radius. This means that the largest mixing volume coincides with the highest potential shear rates.

By interengage is meant that the teeth of a rotor or stator ring always extend into the valley defined between a pair of adjacent rings of the stator or rotor, whilst the ridges may or may not extend into that valley. Means are provided to drive angularly the rotor or the stator or both so that there is relative movement between the two. Normally only the rotor will be driven to rotate about its axis.

In one form of the mixer, the rings are concentric to the axis of the rotor. However they may also be arranged eccentrically which results in a cleaning action when the rings approach each other. The maximum eccentricity is limited to the separation between the rings forming the complementary valley on the complementary component.

The maximum combined height of a given ring and tooth at any point on the surface of either the stator or rotor is limited by the separation of the stator and rotor. This separation can vary between 0.1 and 300 mm, preferably 1 to 100 mm.

The combined height of the ridges and teeth can be varied by any amount within this limit either around the circumference or along a radial path. The variation can be either continuous or discontinuous, i.e. the transition can be slopped or stepped, but in the preferred form, the ridges and teeth are uniform in height.

The thickness of both the teeth and ridges around their circumference can be varied but in the preferred form is uniform. This thickness can range from 0.1 mm to 100 mm, preferably 1–30 mm.

Any tooth may combine any or all of these characteristics and the transition between them may be continuous or discontinuous, i.e. the transition may be slopped or stepped.

The stator, rotor, ridges and teeth may be made from any material that is dimensionally stable at the operating temperature and under the mechanical strains generated in operation. Such materials include steel, ceramics, rubber and plastics.

The ridges and teeth can be either permanently or removably attached to the rotor and stator. Removable ridges and teeth may also be so attached as to allow their repositioning and re-orientation. The stator which defines the chamber around the rotor may also be either permanently or releasably assembled around the rotor.

Preferably the stator is defined by a pair of mutually facing cup shaped inserts which are clamped together opening-to-opening. When assembled into a single screw extruder, such clamping would be between the extended flanges of the front and rear barrels. In this way the mixing geometry of the device may be altered by replacing the relatively inexpensive inserts.

In operation, the pressure gradient from inlet of the mixer to outlet causes material to flow through the device. There are three tortuous routes that the material can take. A zigzag route over the intermeshing annular ridges and teeth, a route along the annular channels defined by the ridges and a route through the gaps between teeth. All three routes are continuously changing due to relative motion and take material up one a face of the rotor across its edge and back down the obverse.

In one configuration the gaps between teeth on the stator and the rotor are arranged to form radial channels. The rotational motion of the rotor leads to periodic alignment of teeth and gaps and gaps and gaps between the rotor and stator.

However the gaps may be staggered to alter the mixing characteristics. For any given ring the combined length of teeth and gaps is equal to the circumference of that ridge. The teeth may be of any length along the ring within this total but need not be uniform in length.

Dispersive mixing occurs in the gaps between the faces of the annular ridges and teeth on the rotor and their counterparts on the stator. Material within these gaps is subject to both pressure and drag flow due to the motion of the rotor. In this way the melt in the high shear zone is constantly refreshed. Distributive mixing then ensures that this welldispersed material is evenly distributed through the bulk of the melt.

Distributive mixing results from the repeated cutting of the melt as it emerges from gaps between teeth on the stator and also as it enters the next set of gaps between the teeth on the stator. Since the speed of flow into and out of these gaps is slower near to the defining teeth than in the middle, significant reorientation of the melt also occurs.

The mixer can be used in conjunction with a number of functional ancillary elements each of which can be supported by a number of well known devices. The ancillary elements include:

a) means of receiving the process material;

b) means of melting one or more of the components to generate liquid;

c) means of degassing the process melt of the inlet side of the mixer;

d) means of generating pressure on the inlet side of the mixer;

e) means of driving the rotor of the mixer;

f) means of degassing the process melt on the outlet side of the mixer;

g) means of generating pressure on the outlet side of the mixer;

h) means of filtering the process melt; and i) means of forming the process melt. Elements d and e are always required for the operation of the mixer. The need for the other ancillary functional elements is dependent on the users needs, but a single screw extruder can provide functional elements a, b, c, d and e then f, g, h and i. Elements d and e are always required for the operation of the mixer. The need for the other ancillary functional elements is dependent on the users needs. Devices suitable for providing one or more of the functional ancillary elements include:

1) A single screw extruder can provide functional elements a, b, c, d and e then f, g, h and i 2) A twin screw extruder can provide functional elements a, b, c, d and e then f, g, h and i 3) A Z-blade mixer can provide functional elements a, b and c 4) An internal mixer can provide functional elements a, b and c 5) A gear or other pump can provide functional elements d, e and g 6) An external motor can provide functional element e 7) A removable filter system can provide functional element h 8) A removable die can provide functional element i.

BRIEF DESCRIPTION OF DRAWINGS

The invention will now be described in greater detail, by way of example, with reference to the accompanying drawings, in which:

FIG. 2a is a cross section of FIG. 2 along line 2a—2a;

FIG. 3a is a cross section of FIG. 3 along line 3a—3a;

FIG. 4a is a cross section of FIG. 4 along line 4a—4a;

FIG. 5a is a cross section of FIG. 5 along line 5a—5a;

FIG. 6a is a cross section of FIG. 6 along line 6a—6a;

FIG. 7a is a cross section of FIG. 7 along line 7a—7a;

FIGS. 8a to 8e are cross sections of possible alignments of teeth within the channels;.

FIGS. 9a to 9e are cross sections of possible variations in tooth leading edges and tips with the arrow A showing the direction of rotation

FIGS. 10a to 10c are cross sections of ridges and teeth illustrating possible variations in leading edge shape;

FIGS. 11a to 11e illustrate possible variations in tooth cross-section;

DETAILED DESCRIPTION OF THE INVENTION

Figure 1:
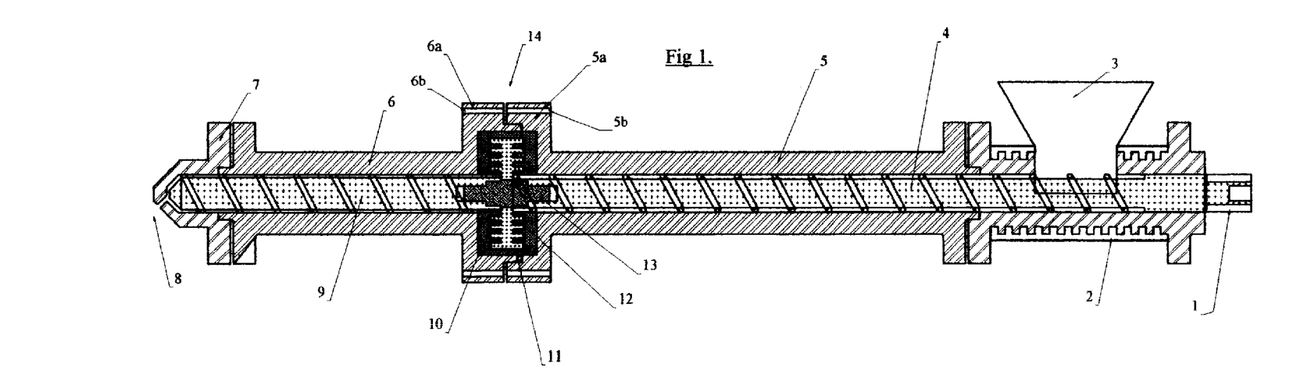
FIG. 1 illustrates a preferred form of a single screw extruder in accordance with the first aspect of the invention, incorporating a mixer in accordance with the second aspect of the invention.

Referring to FIG. 1, the single screw extruder comprises a spline 1 or other coupling from the rotary drive to rear extruder screw 4, a cooling jacket 2, a funnel and feed zone 3, a rear extruder screw 4, a rear barrel 5, an enlarged flange 5A, a front barrel 6, an enlarged flange 6A, a die 7, a discharge nozzle 8, a front screw 9, a rear mixing insert 12 and a front mixing insert 10 which together form a chamber about a mixing rotor 11 and a drive spindle 13. The mixer 14 is provided with a plurality of co-axial holes 5b, 6b to receive bolts (not shown) which constitute a readily releasable means to permit change of one mixer 14 for another mixer, e.g., having different mixing characteristics. The screw of the single screw extruder is thus interrupted by the presence of the mixer 14, comprising elements 10, 11, 12, and 13.

Figure 1A:
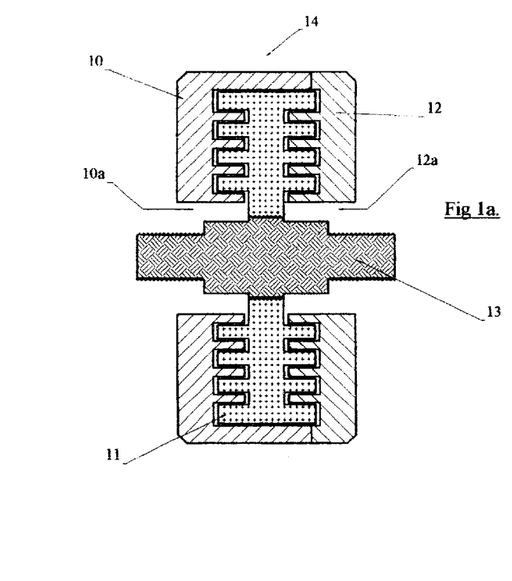
FIG. 1a illustrates an enlarged view of the mixer shown in FIG. 1.
Figure 1B:
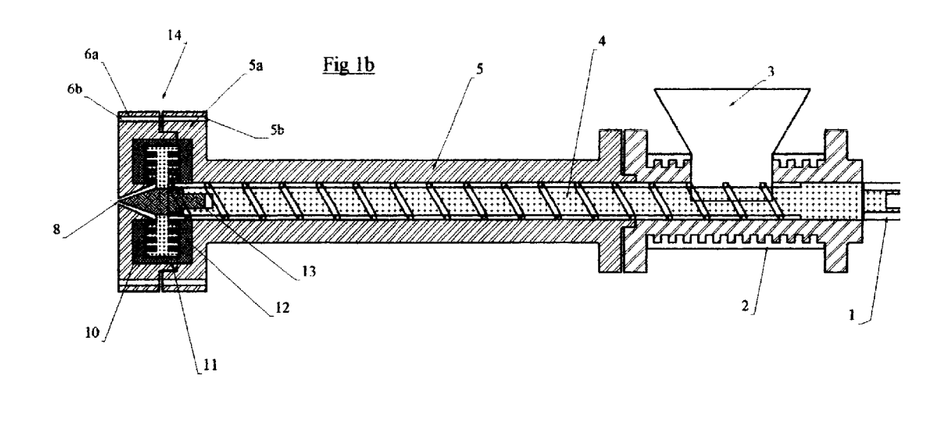
FIG. 1b shows a modification of the extruder of FIG. 1, in which the mixer is located at the discharge end of the screw.

FIG. 1a is a drawing of one embodiment of the invention where the mixer 14 consists of a rear mixing insert 12 and a front mixing insert 10 which together form a chamber about a mixing rotor 11 and a drive spindle 13. Referring to FIG. 1*b*, barrels 5 and 6 can be heated and zone 3 can be cooled by means of a cooling jacket 2. In addition the flanges joining the extruder barrels 5*a* and 6*a* can be heated or cooled to maintain a balance between heat losses to the environment and heat generated within the mixer again by means not shown.

Figure 2:
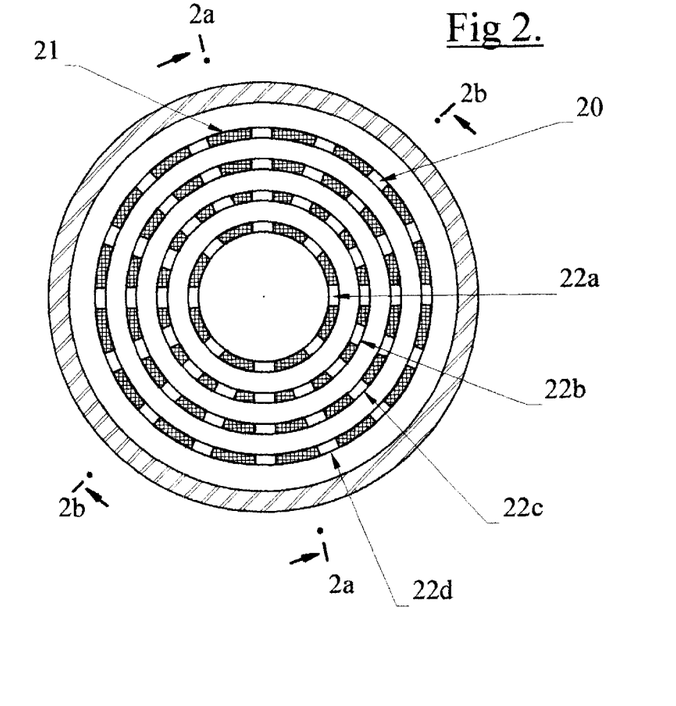
FIG. 2 is an end view of a front mixing insert (10)
Figure 2A:
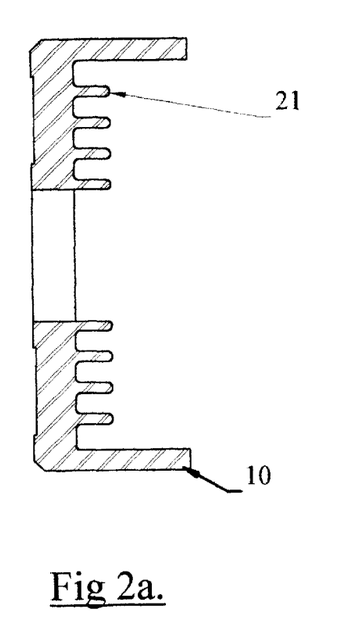
Figure 2B:
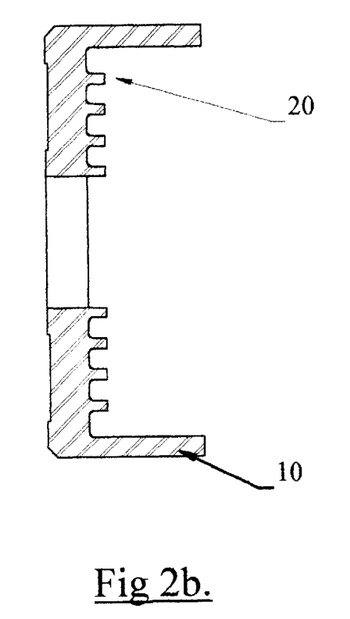
FIG. 2b is a cross section of FIG. 2 along line 2b—2b.

Referring to FIGS. 2, 2*a* and 2*b*, the inside surface of insert 10 is made up of a series of radially spaced-apart rings 22*a*, 22*b*, 22*c*, and 22*d*. Mounted on the rings 22*a*–22*d* are circumferentially spaced-apart and axially projecting teeth 21 so that gaps between adjacent teeth 21 constitute ridges 20 giving the rings 22*a*–22*d* a castellated appearance.

Figure 3:
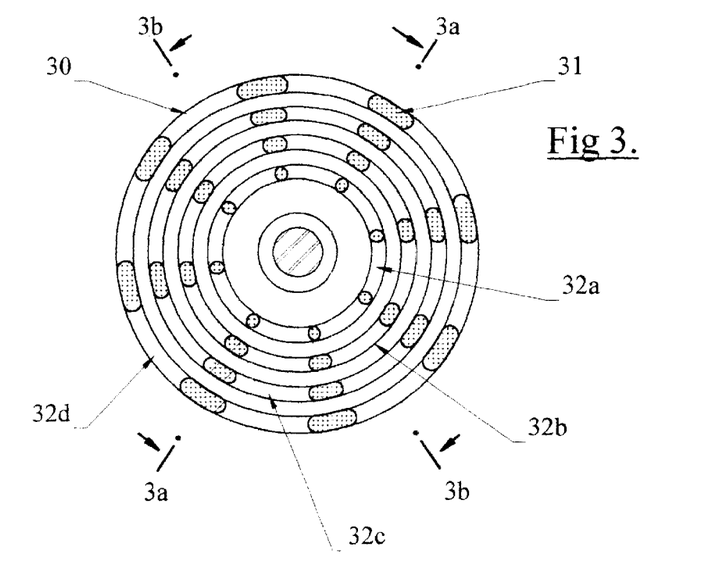
FIG. 3 is an end view of mixing rotor (11)
Figure 3A:
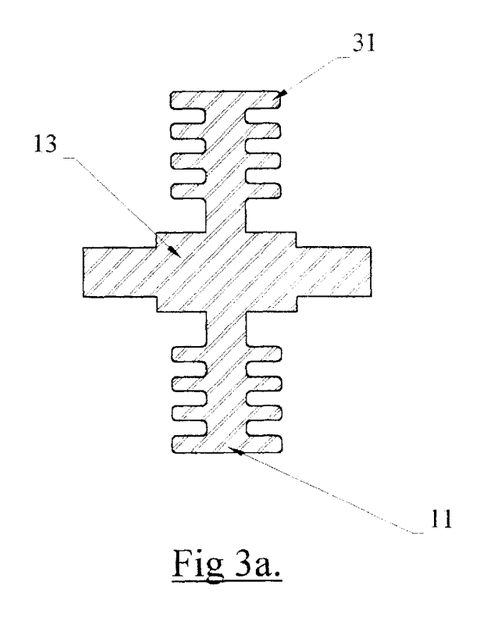
Figure 3B:
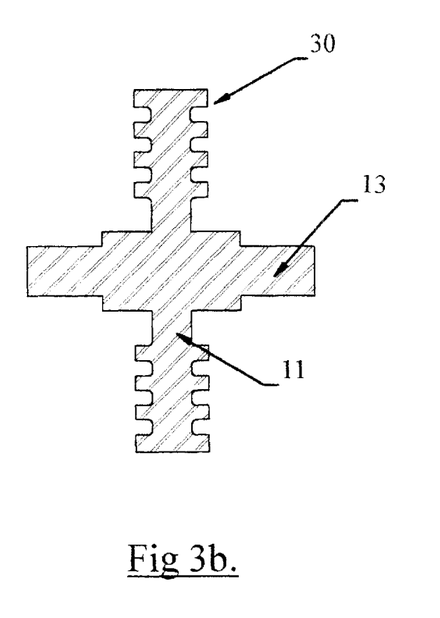
FIG. 3b is a cross section of FIG. 3 along line 3b—3b.

Referring to FIGS. 3, 3*a* and 3*b*, the rotor 11 is mounted on a drive spindle 13 and consists of a circular body, opposed faces of which are each provided with a series of radially spaced-apart rings 32*a*, 32*b*, 32*c* and 32*d*. Mounted on the rings 32*a*–32*d* are circumferentially spaced-apart and axially projecting teeth 31 so that gaps between adjacent teeth 31 constitute ridges 30 giving the rings a castellated appearance. The rings 32*a*, 32*b*, 32*c* and 32*d* intermesh with rings 22*a*, 22*b*, 22*c* and 22*d* in the functional position illustrated in FIGS. 4, 4*a* and 4*b* and in FIGS. 5, 5*a* and 5*b*. The rings 22*a*–22*d*, 32*a*–32*d*, teeth 21, 31, and ridges 20, 30 are so juxtaposed as to define a tortuous, mixing flow path for material, with the arrows 40 and 41 (FIG. 4) illustrating the path of least resistance to the melt flow through ridges (gaps) 20 between teeth 21. As drawn in FIGS. 4–4*b* and 5–5*b*, the flow off the rotor 11 is not constrained by the second insert (12) i.e. only one half of the mixer 14 is shown.

Figure 4:
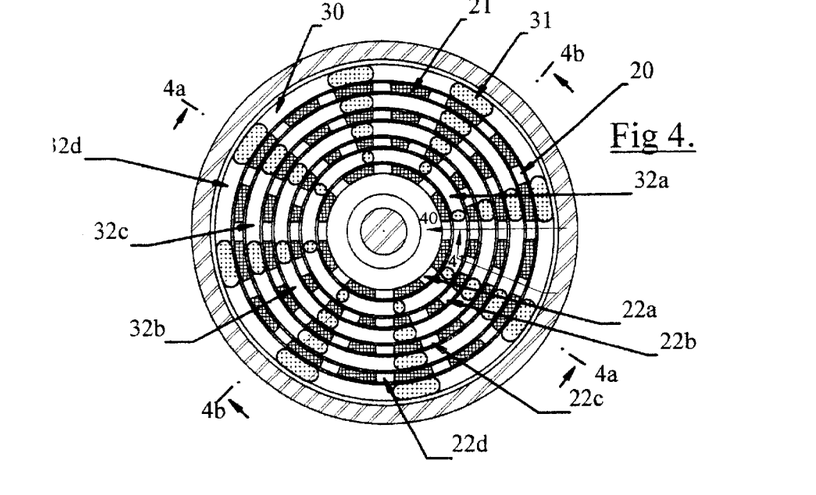
FIG. 4 is an end view of an intermesh between front mixing insert (10); and mixing rotor (11)
Figure 4A:
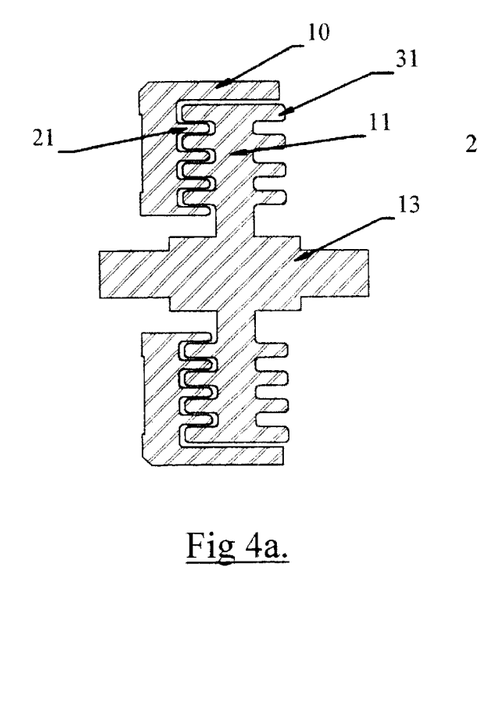
Figure 4B:
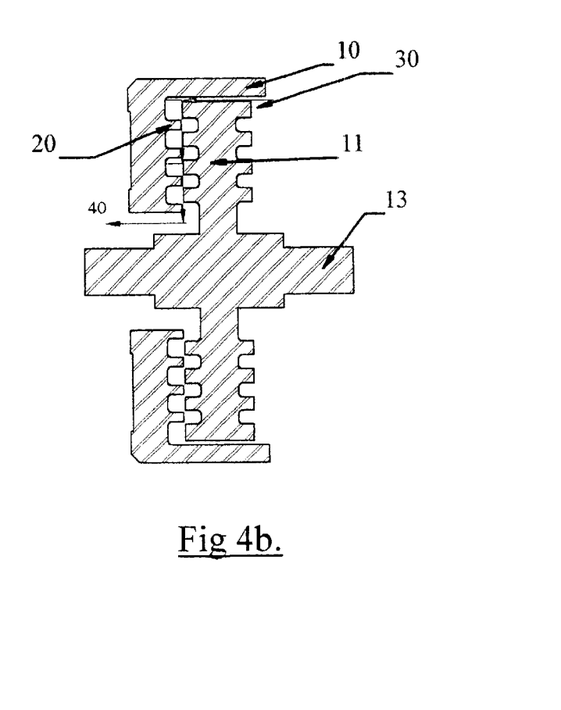
FIG. 4b is a cross section of FIG. 4 along line 4b—4b.
Figure 5:
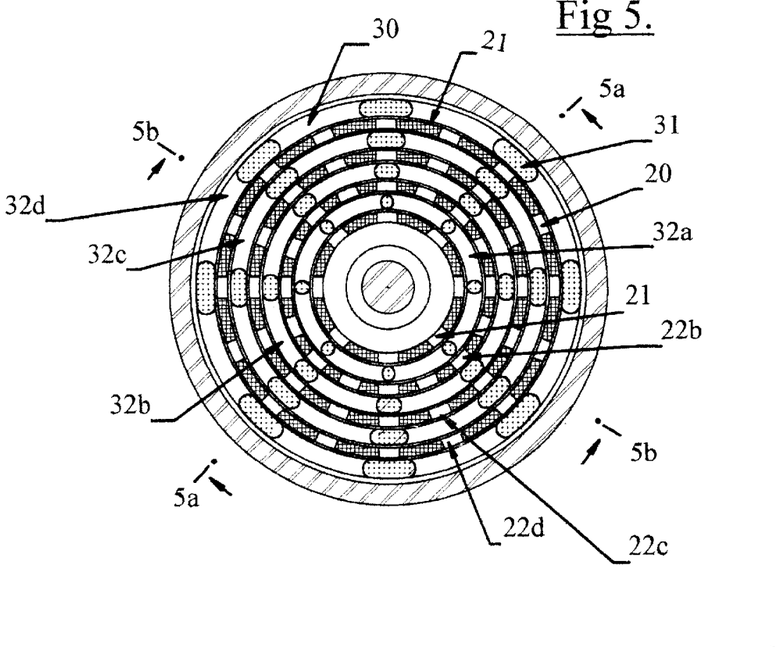
FIG. 5 is an end view of an intermesh between front mixing insert (10), and mixing rotor (11) rotated 33.75 degrees clockwise in comparison to FIG. 4.
Figure 5A:
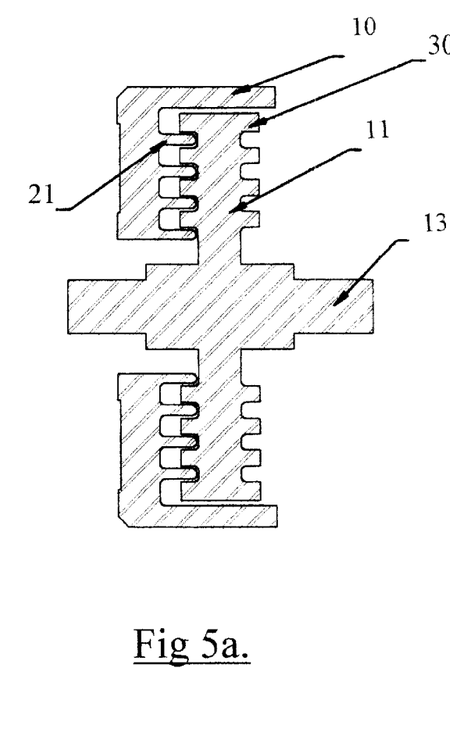
Figure 5B:
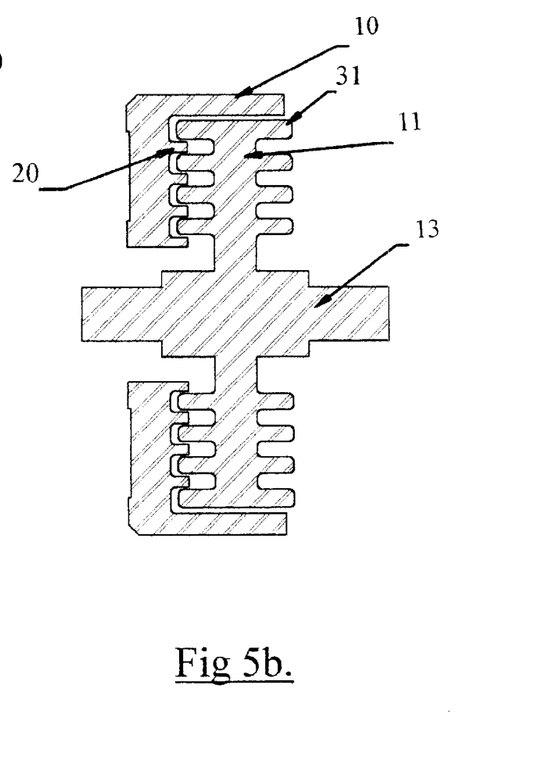
FIG. 5b is a cross section of FIG. 5 along line 5b—5b.

As the rotor 11 moves in relation to its housing the following positions arise:—(a) the teeth 31 on the rotor 11 are in line with the teeth 21 on the ridges 20 (FIG. 4*a*), (b) the teeth 31 on the rotor 11 are cut out of line with the teeth 21 on the ridges 20 (FIG. 4*b*) and (c) the teeth 31 on the rotor 11 are in positions between (a) and (b). Position (a) represents the moment of maximum shear i.e. dispersion and maximum radial flow of the materials being mixed. Position (b) represents the moment of maximum distribution when aliquots of the outward flow of material are taken off in different directions according to whether they are in locations bounded by rotor teeth 31 or locations bounded by housing teeth 21. FIGS. 5, 5*a*, and 5*b* show the same elements, rotated 33.75 degrees clockwise in comparison to FIG. 4.

Figure 6:
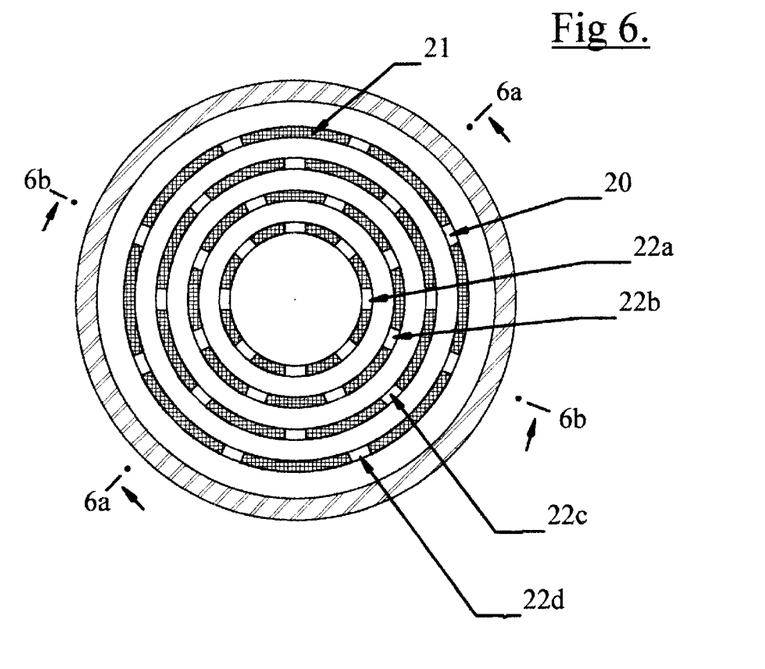
FIG. 6 is an end view of an alternative front mixing insert without radial alignment of the gaps between teeth.
Figure 6A:
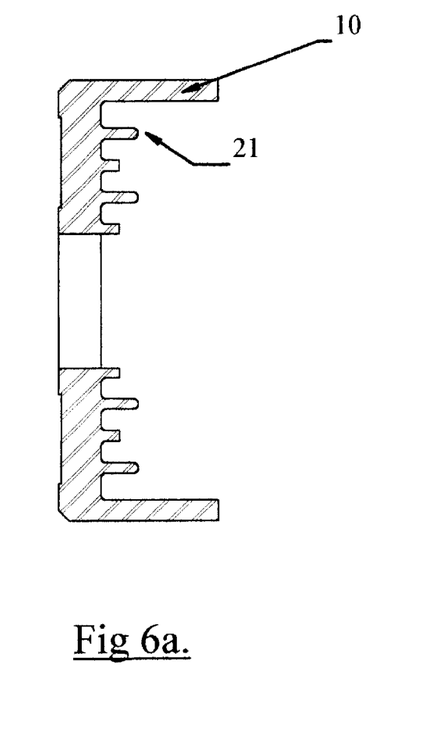
Figure 6B:
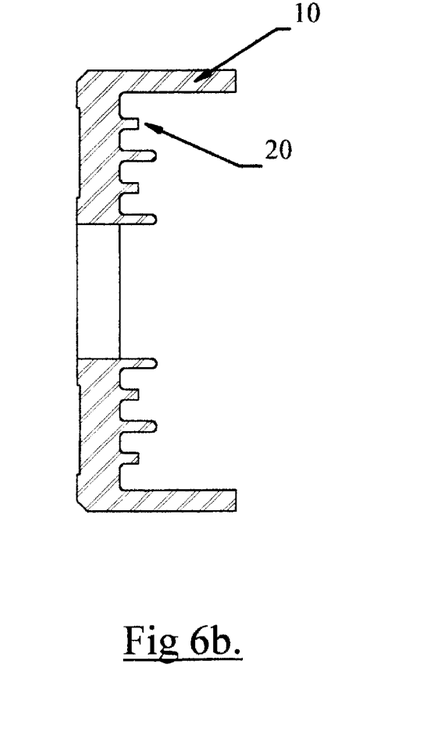
FIG. 6b is a cross section of FIG. 6 along line 6b—6b.

FIGS. 6, 6*a*, and 6*b* show an insert 10 where the gaps 20 are not aligned to give a contiguous linear radial path and so the path of least resistance involves annular as well as radial displacements.

Figure 7:
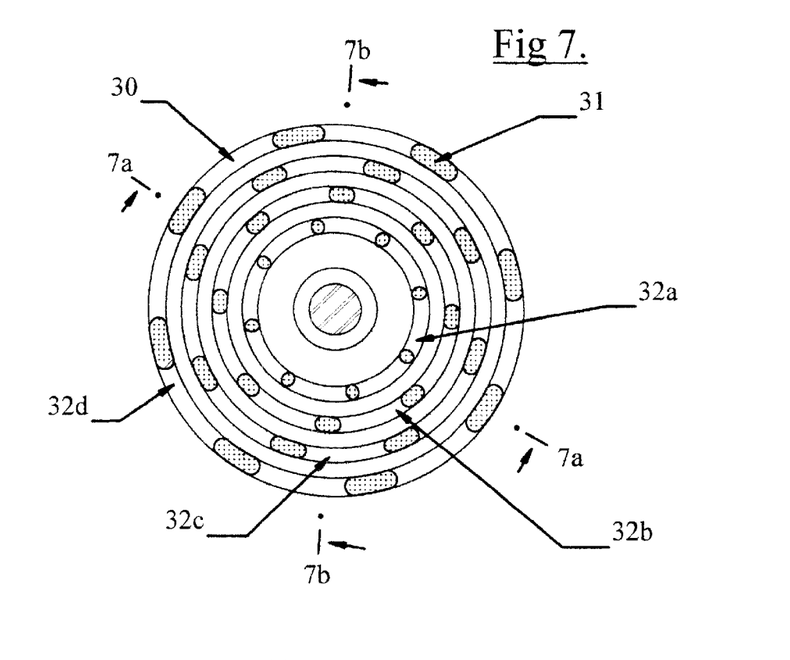
FIG. 7 is an end view of an alternative mixing rotor.
Figure 7A:
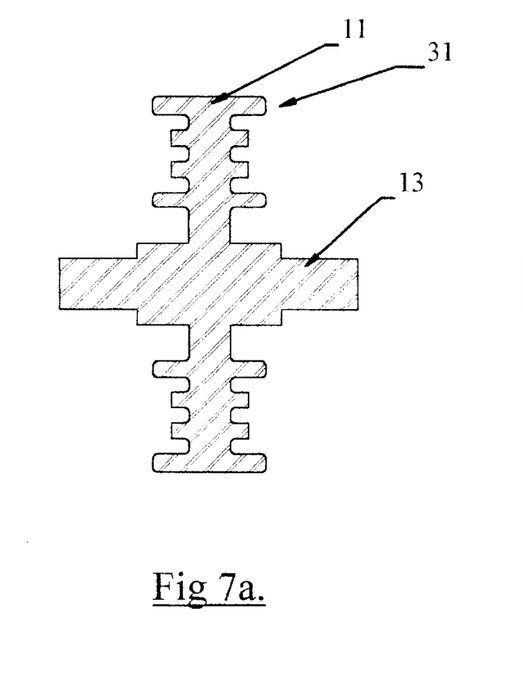
Figure 7B:
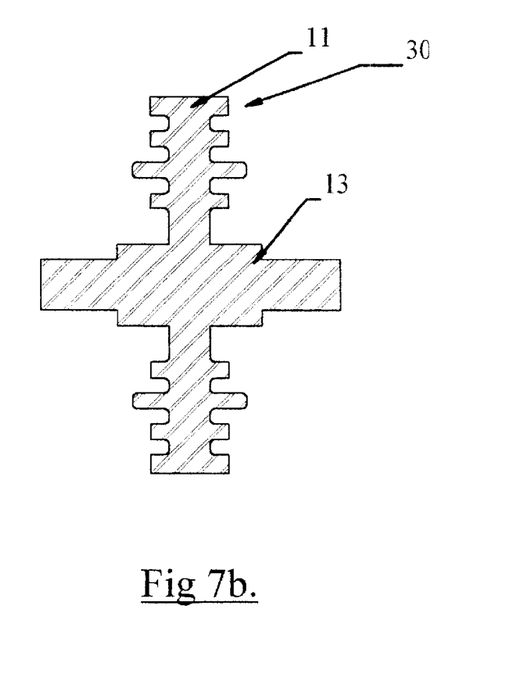
FIG. 7b is a cross section of FIG. 7 along line 7b—7b.

FIGS. 7, 7*a*, and 7*b* show a rotor 11 where the teeth 31 are not aligned to give a contiguous linear radial path and so the path of least resistance involves annular as well as radial displacements.

FIGS. 8*a*–8*e*, 9*a*–9*e* and 10*a*–10*c* show various possible tooth geometries. Referring to these figures it can be appreciated that the shape of the leading edge and the orientation of the individual teeth can promote movement of the melt in particular directions within the mixer 14, which may be highly advantageous to both transport of material through the mixer 14 and also in terms of promoting dispersive conditions such as elongation flow.

Figure 8A:
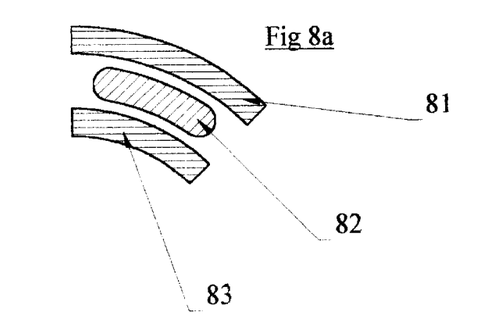
FIG. 8a illustrates a tooth symmetrically aligned in the channel.
Figure 8B:
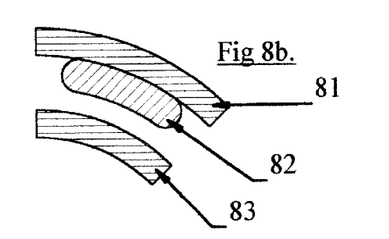
FIG. 8b illustrates a tooth aligned with the outside channel wall.
Figure 8C:
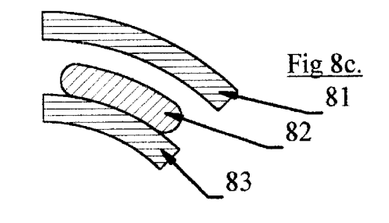
FIG. 8c illustrates a tooth aligned with the inside channel wall.
Figure 8D:
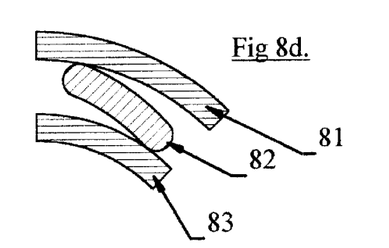
FIG. 8d illustrates a tooth with a negative pitch.
Figure 8E:
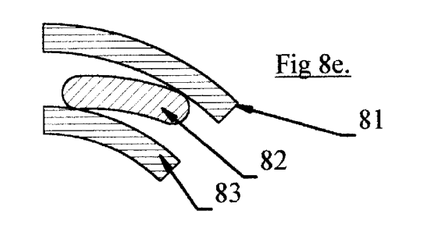
FIG. 8e illustrates a tooth with a positive pitch.

FIGS. 8*a*–8*e* show a rotor tooth 82 between stator teeth 81 and 83 with the tooth centred in FIG. 8*a*, scraping the outer tooth 81 in FIG. 8*b*, scraping the inner stator tooth 83 in FIG. 8*c* and shows a positive pitch (FIG. 8*e*) of the tooth 81 body which will push material outwards within the mixer 14 whilst a negative pitch (FIG. 8*d*) will bring it towards the centre.

Figure 9A:
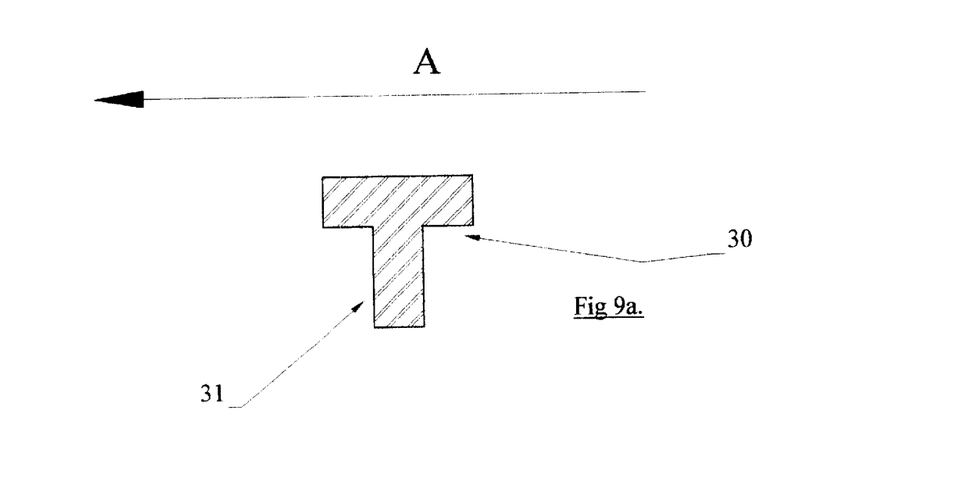
FIG. 9a illustrates a neutral leading edge with neutral tip.
Figure 9B:
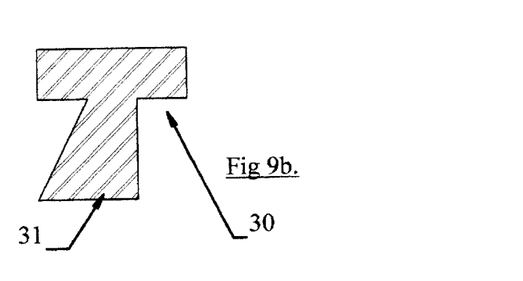
FIG. 9b illustrates a positive leading edge and neutral tip.
Figure 9C:
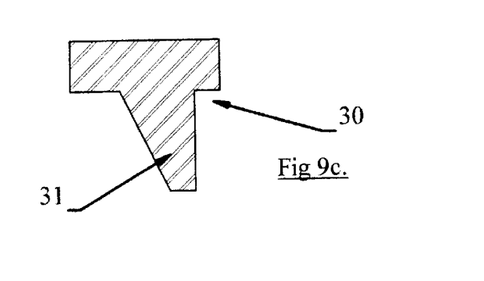
FIG. 9c illustrates a negative leading edge and neutral tip.
Figure 9D:
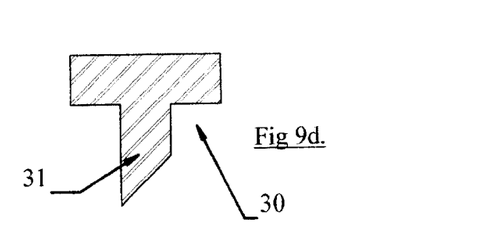
FIG. 9d illustrates a neutral leading edge and positive tip rake.
Figure 9E:
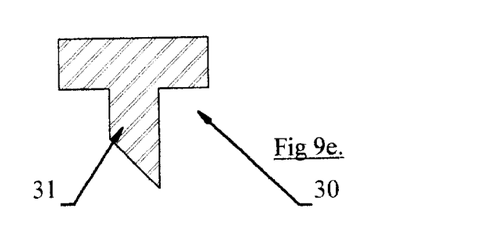
FIG. 9e illustrates a neutral leading edge and negative tip rake.

FIGS. 9*a*–9*e* show a tooth 31 leading edge having a neutral rake (FIG. 9*a*), a positive rake on the leading edge (FIG. 9*b*) which will transport material from the base of a valley towards the rotor 11 disc, whilst a negative rake (FIG. 9*c*) will push material down into the stator. The arrow A indicates the direction of rotation. FIGS. 9*d* and 9*e* show a neutral rake with variation in the configuration of the tooth 31 tip.

Figure 10A:
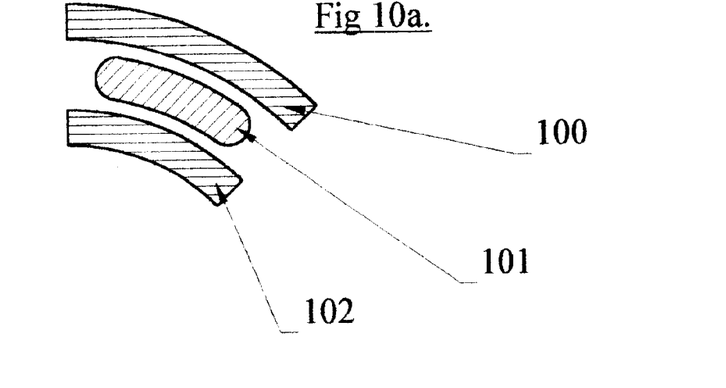
FIG. 10a illustrates a symmetrical leading edge.
Figure 10B:
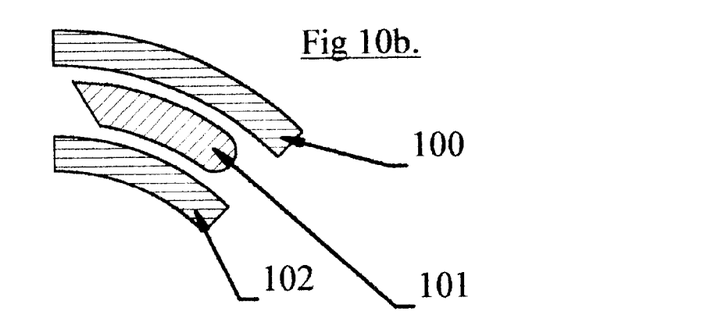
FIG. 10b illustrates a negative edge bias.
Figure 10C:
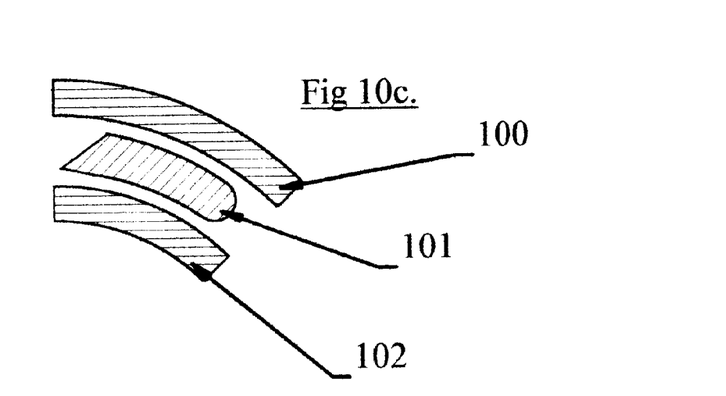
FIG. 10c illustrates a positive edge bias.

FIGS. 10*a*–10*c* show rotor tooth 101 between stator teeth 100 and 102 with a positive bevel (FIG. 10*c* on the leading edge which will push material outwards within the mixer 14 whilst a negative bevel (FIG. 10*b* will bring it towards the centre.

Figure 11A:
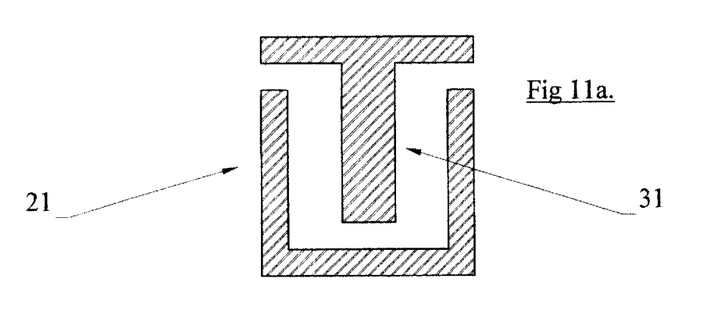
FIG. 11a illustrates a parallel tooth in parallel channel.
Figure 11B:
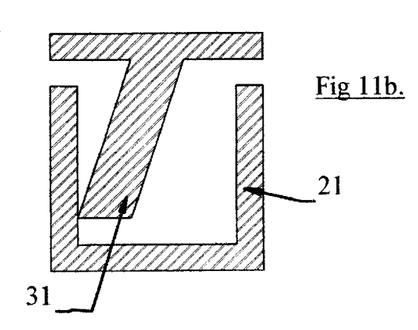
FIG. 11b illustrates a negative sweep in parallel channel.
Figure 11C:
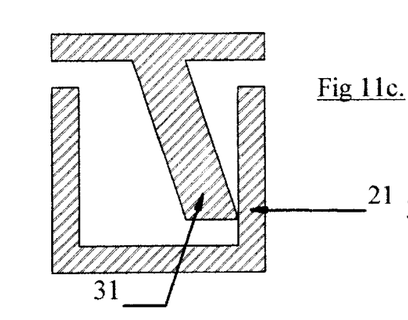
FIG. 11c illustrates a positive sweep in parallel channel.
Figure 11D:
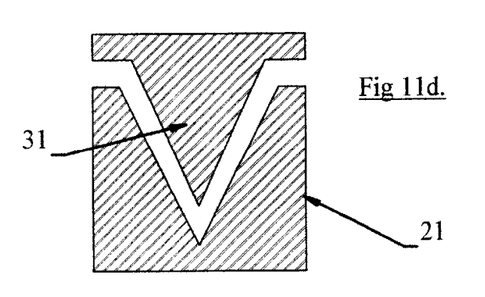
FIG. 11d illustrates a tapered tooth in tapered channel.
Figure 11E:
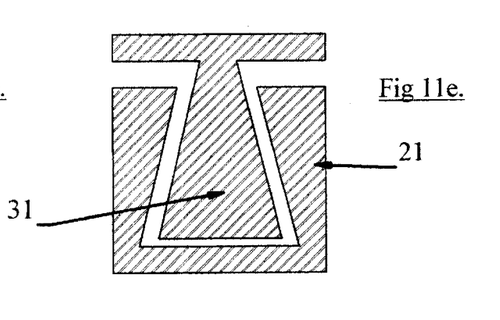
FIG. 11e illustrates a inverted tapered tooth in inverted tapered channel.

FIGS. 11*a*–11*e* illustrate that the configuration could be a parallel tooth 31 in a parallel channel 21 (FIG. 11*a*); a negative tooth 31 in a parallel channel 21 (FIG. 11*b*); a positive tooth 31 in a parallel channel 21 (FIG. 11*c*); a taper tooth 31 in a taper channel 21 (FIG. 11*d*); or an inverted taper tooth 31 in an inverted taper channel 21 (FIG. 11*e*).

Figure 12:
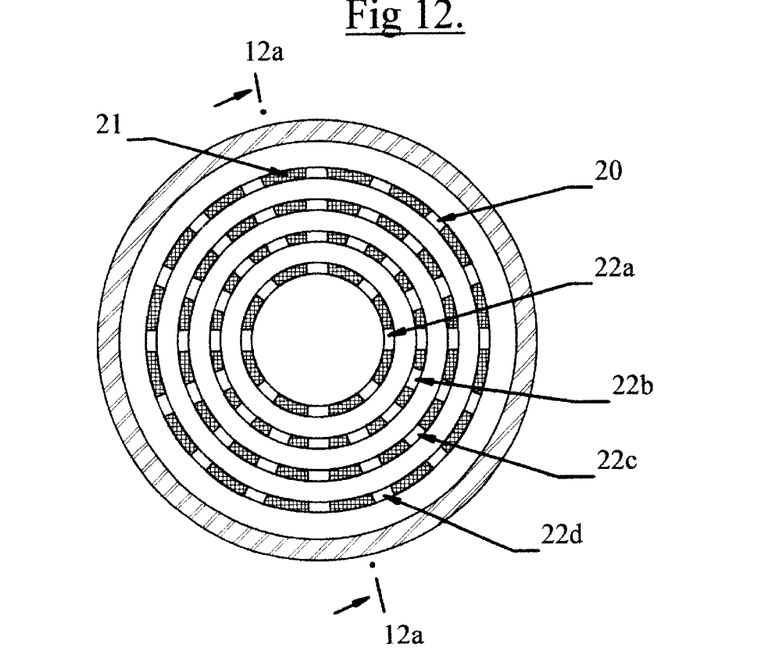
FIG. 12 illustrate possible variations in insert end wall geometry.
Figure 12A:
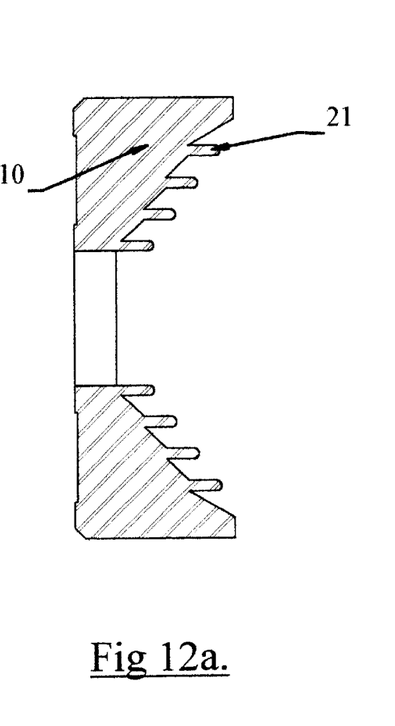
FIG. 12a is a section through 12a—12a for a conical end wall.
Figure 12B:
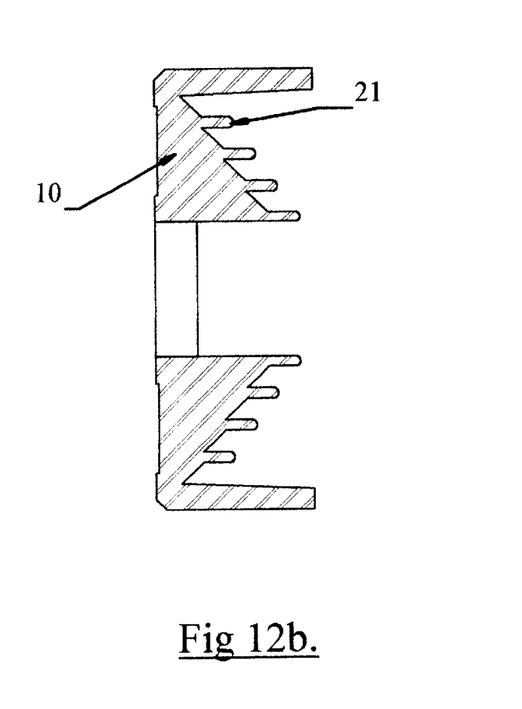
FIG. 12b is a section through 12a—12a for an inverted conical end wall.
Figure 13:
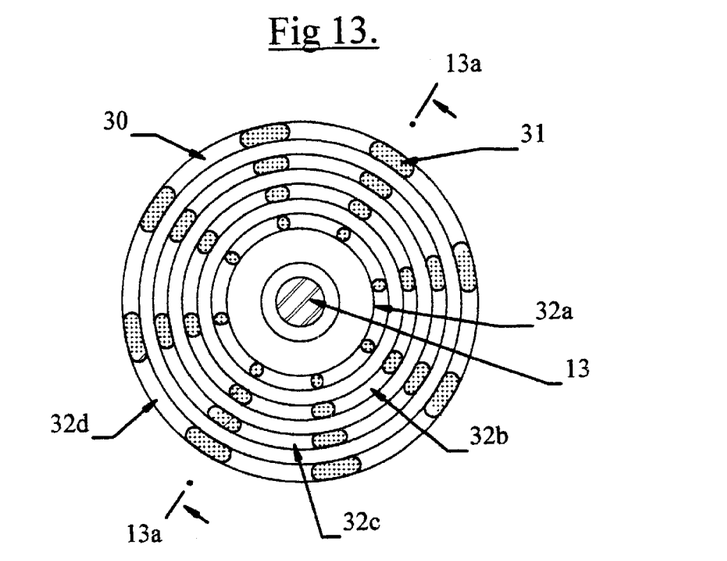
FIG. 13 illustrates a possible variations in rotor disk geometry.
Figure 13A:
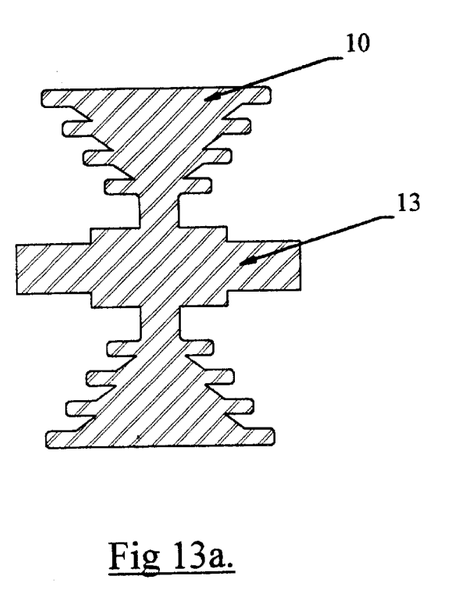
FIG. 13a is a section through 13a—13a for an inverted conical disk.
Figure 13B:
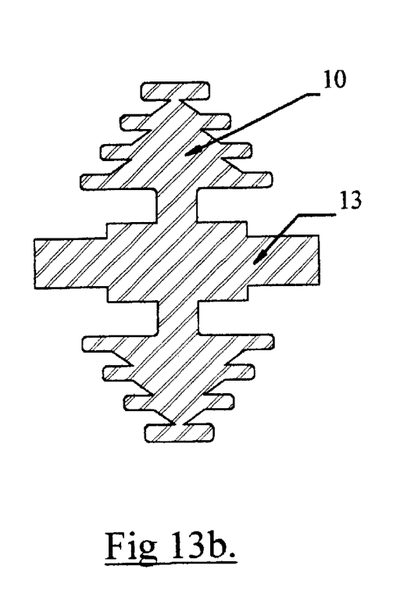
FIG. 13b is a section through 13a—13a. for a conical disk.

Alternative geometries are also possible for insert 10 and rotor 11. As shown in FIGS. 2, 2*a*, and 2*b* and described above, the inside surface of insert 10 may be made up of a series of radially spaced-apart rings 22*a*, 22*b*, 22*c*, and 22*d*. Mounted on the rings are circumferentially spaced-apart and axially projecting teeth 21 so that gaps between adjacent teeth constitute ridges 20 giving the rings a castellated appearance. As shown in FIGS. 3, 3*a*, and 3*b* and described above, the rotor 11 is mounted on a drive spindle 13 and consists of a circular body, opposed faces of which are each provided with a series of radially spaced apart rings 32*a*, 32*b*, 32*c* and 32*d*. Mounted on the rings are circumferentially spaced-apart and axially projecting teeth 31 so that gaps between adjacent teeth constitute ridges 30 giving the rings a castellated appearance. Referring to FIGS. 12, 12*a*, and 12*b*, alternative embodiments are shown wherein insert 10 may comprise a conical (FIG. 12*a*) or an inverted conical (FIG. 12*b*) end wall. Referring to FIGS. 13, 13*a* and 13*b*, corresponding alternative embodiments for rotor 11 disk geometry are shown comprising an inverted conical disk (FIG. 13*a*) and a conical disk (FIG. 13*b*).

Use of the extruder of the present invention will now be described. A polymer, polymer blend or polymer/solid additive mixture is fed into the extruder via the hopper and feed port 3 and is conveyed along the rear barrel 5 by the rotation of the rear screw 4 which is driven by an external drive (not shown) via the coupling 1. Heat supplied via the barrel 5 causes the polymer to become liquid or at least readily deformable before reaching the rear mixing insert 12.

The mixing inserts 10, 12 could be integrated into the flanges 5A, 6A of the two barrel sections 5, 6 but by making them removable, mixing geometry and hence mixing effects can be changed by replacing the relatively inexpensive inserts rather than the entire barrel.

The front 10 and rear 12 inserts are clamped together by flanges to form a cylindrical chamber with inlet 12*a* and outlet 10*a* as shown in FIG. 1*a*. The surfaces of the mixing inserts 10, 12 and rotor 11 are covered with a series of annular ridges 20, 30. An example of this is shown in FIGS. 2 and 3. Ridges 20, 30 are offset from each other so that they can intermesh as shown in FIG. 4. On top of the ridges 20, 30 are a series of teeth 21, 31. The polymer melt can flow around the annular channels, outwards or inwards through the gaps 20, 30 between the teeth 21, 31 or follow a longer path over the tips of the teeth 21, 31. Under operating conditions the rotational motion of the rotor 11 results in a chaotic combination of these. The net sum of all these routes takes the material up one face of the disk across its edge and back down the obverse.

From the discharge port 10a the polymer melt is conveyed by the front screw 9 along the front barrel and pressure is generated to force the melt through the discharge nozzle 8 in the die 7.

What is claimed is:

1. A single screw extruder, for extrusion of material such as polymer, comprising a drivable screw having a longitudinal axis and a diameter, at least one flight provided on said screw, a static, parallel barrel rotatably housing said screw so as to define an annular, material flow gap between an exterior of said screw and an interior of said barrel, a mixer to receive material delivered by said screw and through which mixer said material is forced, said mixer comprising a rotor driven by said screw and a stator, said rotor and said stator each carrying rings of teeth adapted to overlap, wherein said material, upon entering said mixer is firstly urged radially outwardly along a first tortuous mixing path, and then returned inwardly along a second tortuous mixing path, said teeth extending axially, or generally so, with respect to said longitudinal axis of said screw, wherein:
   (i) said mixer has a diameter substantially exceeding that of a delivery end of said screw, such that said teeth of both said rotor and said stator of said mixer are outside said diameter of said screw, and
   (ii) the material is forced through said mixer principally by the pressure generated within said barrel by said screw.

2. An extruder as claimed in claim 1, wherein said mixer is located intermediate opposite ends of said screw.

3. An extruder as claimed in claim 1, wherein said mixer is located at a discharge end of said screw.

4. An extruder as claimed in claim 1, wherein readily releasable means are provided, permitting ready changes of one said mixer for another said mixer having different characteristics to suit changes of material being extruded.

5. An extruder as claimed in claim 1, wherein said rotor has a higher aspect ratio per unit axial length than said screw to which it is attached.

6. An extruder as claimed in claim 1, wherein said stator teeth are provided on removable inserts.

7. An extruder as claimed in claim 1, wherein said rotor teeth are provided on a removable rotor.

8. An extruder as claimed in claim 1, wherein said mixer comprises said rotor rotatable within said stator with opposed faces of said rotor, and opposed faces of said stator each having at least one circumferential extending ring of interrupted, axially projecting teeth, wherein:
   (i) said stator comprises a chamber having said opposed side faces, wherein a plurality of axially projecting, radially spaced-apart rings having alternating teeth and ridges with channels defined between said adjacent rings are provided on each said opposed face of said chamber of said stator, and
   (ii) said rotor has said opposed side faces, and a plurality of axially projecting, radially spaced-apart rings incorporating alternating teeth and ridges with channels defined between said adjacent rings are provided on each of said opposite side faces of said rotor, and
   (iii) said rotor rings interdigitate with said stator rings, with one of said stator rings located in one of said rotor channels and one of said rotor rings located in one of said stator channels, such that at least tips of said stator ring teeth overlap at least tops of said rotor ring ridges, and at least tips of said rotor ring teeth overlap at least tops of said stator ring ridges, with both radial and axial clearance so as to define, in the direction of material flow through said mixer, said first tortuous mixing path flowing radially outwardly from the axis of rotation of said rotor, followed by said second, tortuous mixing path flowing radially inwardly to the axis of rotation of said rotor.

* * * * *